(12) United States Patent
Jung et al.

(10) Patent No.: US 8,873,509 B2
(45) Date of Patent: Oct. 28, 2014

(54) EFFICIENT HANDOVER METHOD IN BROADBAND WIRELESS ACCESS SYSTEM

(75) Inventors: In Uk Jung, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 254 days.

(21) Appl. No.: 13/318,128

(22) PCT Filed: Apr. 30, 2010

(86) PCT No.: PCT/KR2010/002760
§ 371 (c)(1),
(2), (4) Date: Oct. 28, 2011

(87) PCT Pub. No.: WO2010/126335
PCT Pub. Date: Nov. 4, 2010

(65) Prior Publication Data
US 2012/0044909 A1 Feb. 23, 2012

Related U.S. Application Data

(60) Provisional application No. 61/173,987, filed on Apr. 30, 2009.

(51) Int. Cl.
*H04W 4/00* (2009.01)
*H04W 36/00* (2009.01)

(52) U.S. Cl.
CPC ...... *H04W 36/0088* (2013.01); *H04W 36/0077* (2013.01)
USPC ........................................... 370/331

(58) Field of Classification Search
CPC .................................................. H04W 36/0088
USPC .......................................... 370/331; 455/427
See application file for complete search history.

(56) References Cited

U.S. PATENT DOCUMENTS

| | | | |
|---|---|---|---|
| 2005/0043062 A1 | 2/2005 | Ahn et al. | |
| 2008/0139207 A1* | 6/2008 | Son et al. | 455/437 |
| 2009/0196257 A1* | 8/2009 | Kim et al. | 370/331 |
| 2009/0303909 A1* | 12/2009 | Farhoudi et al. | 370/312 |
| 2011/0281581 A1* | 11/2011 | Brandt et al. | 455/427 |

FOREIGN PATENT DOCUMENTS

| | | |
|---|---|---|
| KR | 1020070005105 | 1/2007 |
| WO | 2006/083152 | 8/2006 |
| WO | 2007/052966 | 5/2007 |

* cited by examiner

*Primary Examiner* — Wei Zhao
(74) *Attorney, Agent, or Firm* — Lee, Hong, Degerman, Kang & Waimey (57) ABSTRACT

The present invention relates to a broadband wireless access system, and more particularly, to a handover method that can reduce a stop time in an entry before a break-type handover for performing more efficient handover, and to apparatus for performing same. A handover method for a terminal in a broadband wireless access system according to one embodiment of the present invention may include: receiving, from a serving base station, a handover command message including the information of a section in which scheduling for the terminal is not performed; transmitting a ranging code to a target base station during the section; and receiving information indicating the transmitted result of the ranging code from the serving base station.

8 Claims, 8 Drawing Sheets

EFFICIENT HANDOVER METHOD IN BROADBAND WIRELESS ACCESS SYSTEM

CROSS-REFERENCE TO RELATED APPLICATIONS

This application is the National Stage filing under 35 U.S.C. 371 of International Application No. PCT/KR2010/002760, filed on Apr. 30, 2010, which claims priority to U.S. Provisional Application Ser. No. 61/173,987, filed on Apr. 30, 2009, the contents of all of which are incorporated by reference herein in their entireties.

TECHNICAL FIELD

The present invention relates to a broadband wireless access system, and more particularly, to a method and apparatus for performing handover, which can reduce an interruption time in handover of an entry-before-break type, for efficient handover.

BACKGROUND ART

Handover (HO) refers to movement of a Mobile Station (MS) from a wireless interface of one Base Station (BS) to a wireless interface of another BS. Hereinafter, a handover procedure in a general IEEE 802.16e system will be described.

A Serving Base Station (SBS) in an IEEE 802.16e network may broadcast information about neighbor BSs through a mobile neighbor advertisement (MOB_NBR-ADV) message in order to inform an MS of information (topology) about basic network configuration.

The MOB_NBR-ADV message includes system information about an SBS and neighbor BSs, for example, a preamble index, a frequency, an HO optimization possibility, Downlink Channel Descriptor (DCD)/Uplink Channel Descriptor (UCD) information, etc.

The DCD/UCD information includes information of which an MS should be aware in order to exchange information through downlink and uplink. For example, the DCD/UCD information includes HO trigger information, and Medium Access Control (MAC) version and Media Independent Handover (MIH) capability information of a BS.

A general MOB_NBR-ADV message includes information about neighbor BSs of an IEEE 802.16e type only. Accordingly, information about neighbor BSs of a type other than IEEE 802.16e may be broadcast to MSs through a Service Identity Information Advertisement (SII-ADV) message. As a result, an MS may acquire information about BSs of a heterogeneous network by requesting a serving BS to transmit the SII-ADV message.

A procedure for an MS having information about neighbor BSs obtained through the above-described method to perform HO in an IEEE 802.16e network will be described in more detail with reference to FIG. 1.

Figure 1:
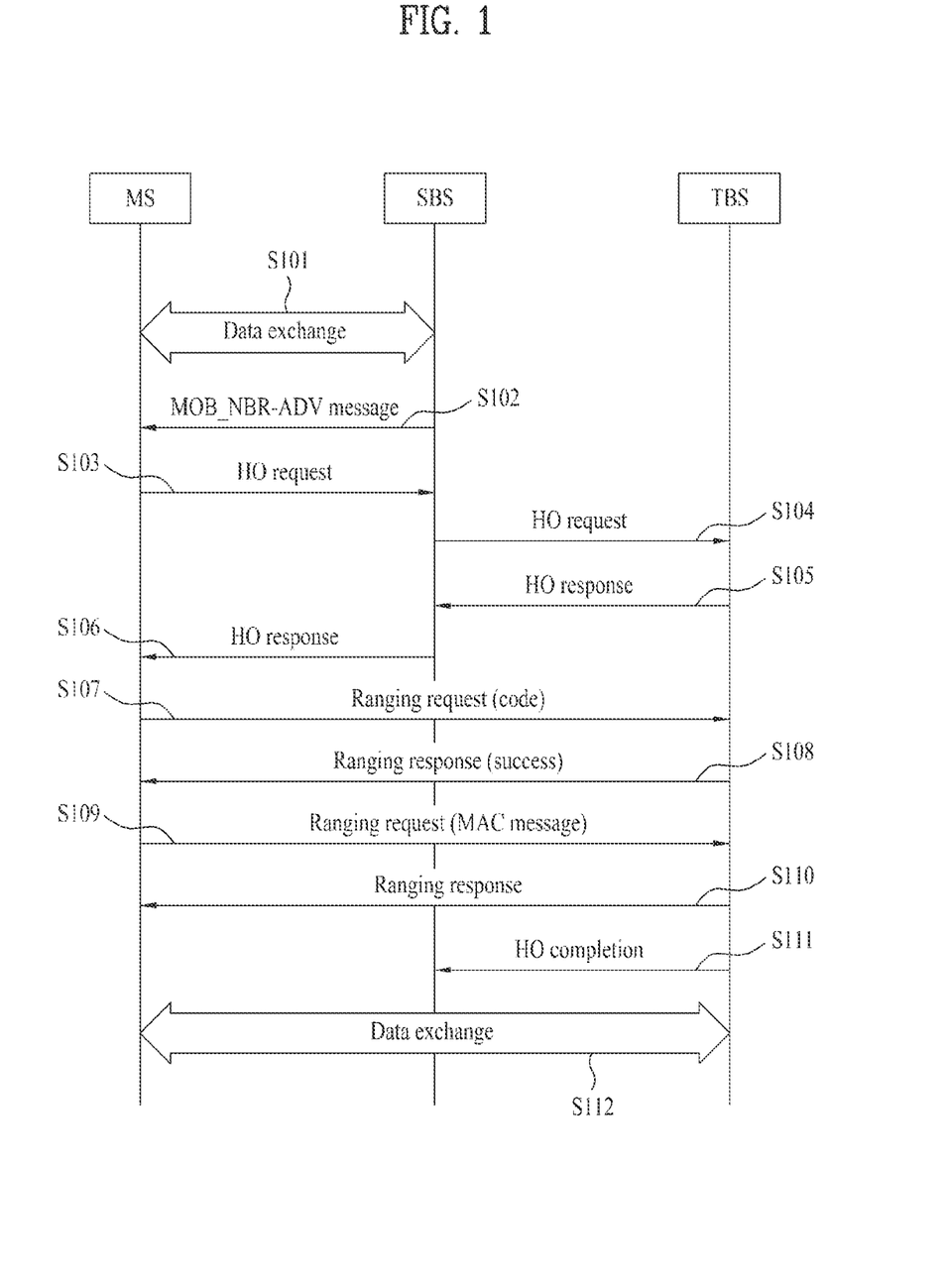
FIG. 1 illustrates an example of an HO procedure which can be performed in an IEEE 802.16e system.

FIG. 1 illustrates an example of an HO procedure which can be performed in an IEEE 802.16e system.

Referring to FIG. 1, an MS exchanges data with an SBS at step S10I.

The SBS may periodically broadcast information about neighbor BSs to the MS through a MOB_NBR-ADV message at step S102.

The MS may start scanning for candidate HO BSs using an HO trigger condition while communicating with the SBS. The MS may request the SBS to perform an HO procedure by transmitting an HO request (M0B_MSH0-REQ) message when an HO condition is satisfied, for example, when a predetermined hysteresis margin value is exceeded at step S103.

The SBS may inform candidate HO BSs included in the MOB_MSHO-REQ message that the MS has requested HO through an HO request (HO-REQ) message at step S104.

The candidate HO BSs take action for the MS having requested HO to transmit information about HO to the SBS through an HO response (HO-RSP) message at step S105.

The SBS may transmit the information about HO, obtained through the HO-RSP message from the candidate HO BSs, to the MS through an HO response (MOB_BSHO-RSP) message. The MOB_BSHO-RSP message may include information necessary to perform HO, that is, an HO action time, an HO identifier (HO-ID), and a dedicated HO Code Division Multiple Access (CDMA) ranging code at step S106.

The MS determines one Target BS (TBS) among the candidate BSs based on the information included in the MOB-BSHO-RSP message received from the SBS. The MS then transmits a CDMA code to the determined TBS to attempt ranging at step S107.

The TBS receiving the CDMA code may inform the MS of ranging success or failure and physical correction values through a ranging response (RNG-RSP) message at step S108.

Next, the MS may transmit a ranging request (RNG-REQ) message for authentication to the TBS at step S109.

The TBS receiving the RNG-REQ message from the MS may transmit system information, which can be used in a corresponding BS, such as a Connection Identifier (CID) to the MS through a ranging response (RNG-RSP) message at step S110.

If the TBS successfully completes authentication of the MS and transmits all update information, the TBS informs the SBS of the MS of HO success or failure through an HO completion (HO-CMPT) message at step S111.

Next, the MS may exchange data with the TBS which has performed HO at step S112.

The HO procedure for use in the IEEE 802.16m system is similar to the HO procedure for use in the IEEE 802.16e system. However, individual messages may be called in different ways as denoted below.

MOB_NBR-ADV->AAI_NBR-ADV: Corresponding message includes system information transmitted in an S-SFH format rather than a DCD/UCD format.

MSHO-REQ->AAI_HO-REQ

BSHO-RSP->AAI_H0-CMD

RNG-REQ (CDMA code)->Ranging preamble code

RNG-RSP (ranging status) ->AAI_RNG-ACK (ranging status)

RNG-REQ (MAC message)->AAI_RNG-REQ

RNG-RSP->AAI_RNG-RSP: Corresponding message includes a station identifier, such as a TSID or STID, instead of a CID.

In order to reduce an interruption time in an HO process, HO to the TBS may be phased over predetermined intervals while the MS maintains communication with the SBS. This is called Entry-Before-Break (EBB) HO. Although the interruption time can be reduced through EBB HO, the MS cannot receive scheduling from the SBS during an HO execution interval of the MS to the TBS. Accordingly, a method for efficiently performing HO by reducing the HO execution interval of the MS to the TBS is needed.

DETAILED DESCRIPTION OF THE INVENTION

Technical Problems

The present invention is devised to solve the above-described problem of the general art and an object of the present invention is to provide a method and apparatus for more efficiently performing HO.

Another object of the present invention is to provide a method and apparatus for more efficiently performing HO, which can reduce an HO execution interval of an MS to a TBS during EBB HO.

It will be appreciated by persons skilled in the art that the objects that can be achieved by the present invention are not limited to what has been particularly described hereinabove and the above and other objects will be more clearly understood from the following detailed description.

Technical Solutions

To achieve these objects, a method for performing handover of a mobile station in a broadband wireless access system according to an embodiment of the present invention includes receiving a handover command message including information about an interval during which scheduling for the mobile station is not performed from a serving base station; transmitting a ranging code to a target base station during the interval; and receiving information indicating a transmission result of the ranging code from the serving base station.

The information indicating a transmission result of the ranging code may be transmitted by the target base station to the serving base station through a backhaul.

If the transmission result is success, the method may further include receiving uplink grant information indicating an uplink resource for transmitting a ranging request message from the serving base station; and transmitting the ranging request message to the target base station through the uplink resource.

The reception of the information may be performed after the interval is ended.

To achieve these objects, a method for performing handover of a target base station in a broadband wireless access system according to an embodiment of the present invention includes negotiating a handover parameter including an interval during which a serving base station does not perform scheduling for a mobile station; receiving a ranging code from the mobile station during the interval; determining a reception state of the ranging code; and transmitting reception state information based on the determination result to the serving base station through a backhaul.

If the determination result indicates that the reception state is success, the method may further include transmitting uplink grant information indicating an uplink resource for transmitting a ranging request message by the mobile station to the serving base station; and receiving the ranging request message from the mobile station through the uplink resource.

The reception may be performed after the interval is ended.

To achieve these objects, a method for performing handover of a serving base station in a broadband wireless access system according to an embodiment of the present invention includes transmitting a handover command message including information about an interval during which scheduling for a mobile station is not performed to the mobile station; receiving reception state information of a ranging code transmitted to a target base station by the mobile station from the target base station through a backhaul; and transmitting the reception state information to the mobile station.

If the transmission result is success, the method may further include receiving uplink grant information indicating an uplink resource for transmitting a ranging request message by the mobile station from the target base station; and transmitting the ranging request message to the mobile station.

The transmission of the reception station information may be performed after the interval is ended.

To achieve these objects, a mobile station according to another embodiment of the present invention includes a processor; and a Radio Frequency (RF) module for externally transmitting and receiving a radio signal according to control of the processor. The processor performs a control function to acquire information about an interval during which scheduling for the mobile station is not performed through a handover command message received from a serving base station, transmit a ranging code to a target base station during the interval, and receive information indicating a transmission result of the ranging code from the serving base station.

The information indicating a transmission result of the ranging code may be transmitted by the target base station to the serving base station through a backhaul.

If the transmission result is success, the processor may perform a control function to receive uplink grant information indicating an uplink resource for transmitting a ranging request message from the serving base station, and to transmit the ranging request message to the target base station through the uplink resource.

The processor may perform a control function to receive the information indicating the transmission result of the ranging code after the interval is ended.

In the above-described embodiments, the handover may be Entry-Before-Break (EBB) handover, the ranging code may be a handover ranging preamble code, and the interval may be a Network_Reentry_Interval.

Advantageous Effects

According to embodiments of the present invention, since information indicating whether a CDMA code for HO has been successfully transmitted is transmitted to an MS from an SBS, an interval during which the MS does not receive scheduling from the SBS is shortened and thus efficient HO can be performed.

It will be appreciated by persons skilled in the art that that the effects that can be achieved with the present invention are not limited to what has been particularly described hereinabove and other advantages of the present invention will be more clearly understood from the following detailed description.

BEST MODE FOR CARRYING OUT THE INVENTION

To solve the above technical problem, the present invention discloses an apparatus for performing more efficient handover (HO).

The following embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In exemplary embodiments of the present invention, a description is made of a data transmission and reception relationship between a base station and a mobile station. Here, the base station refers to a terminal node of a network communicating directly with the mobile station. In some cases, a specific operation described as being performed by the base station may be performed by an upper node of the base station.

Namely, it is apparent that, in a network comprised of a plurality of network nodes including a base station, various operations performed for communication with a mobile station may be performed by the base station, or network nodes other than the base station. The terms 'base station' may be replaced with the terms 'fixed station', 'Node B', 'eNode B' (eNB), 'access point', 'Advanced Base Station' (ABS), etc. The term 'mobile station' may be replaced with the terms 'terminal', 'User Equipment' (UE), 'Mobile Subscriber Station' (MSS), etc.

The embodiments according to the present invention can be implemented by various means, for example, hardware, firmware, software, or combinations thereof.

In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and executed by a processor. The memory unit is located at the interior or exterior of the processor and may transmit data to and receive data from the processor via various known means.

The embodiments of the present invention can be supported by standard documents disclosed in at least one of wireless access systems, i.e., IEEE 802, 3GPP, 3GPP LTE, and 3GPP2. Namely, among the embodiments of the present invention, steps or parts which are not described to clarify the technical features of the present invention can be supported by the above standard documents. Also, all terms disclosed herein can be described by the above standard documents. Particularly, the embodiments of the present invention can be supported by one or more of standard documents of IEEE 802.16, i.e., P802.16e-2004, P802.16e-2005, P802.16Rev2, and IEEE P802.16m.

The specific terms used in the embodiments of the present invention are provided to aid in understanding of the present invention and those terms may be changed without departing from the spirit of the present invention.

A handover (HO) procedure for use in an IEEE 802.16m system will be described hereinafter.

In the IEEE 802.16m system, HO is largely classified into three procedures: HO decision and initiation, HO preparation, and HO execution. Before performing these three procedures, an Advanced Mobile Station (AMS) needs to collect information about neighbor Advanced Base Stations (ABSs). Such a scanning procedure is similar to the scanning procedure in the IEEE 802.16e network. However, when there is an interval during which the AMS does not communicate with a Serving ABS (S-ABS), the AMS may scan neighbor ABSs during the non-communication interval.

In the HO decision and initiation procedure, either the AMS or the S-ABS may initiate HO. If the AMS initiates HO, the AMS transmits an HO request (AAI_HO-REQ) message to the S-ABS. In this case, the AMS determines whether to perform EBB HO according to a decision signal of the S-ABS.

In the HO preparation procedure, AMS information is exchanged between the S-ABS and the T-ABS. Thereafter, a condition of the HO execution procedure and resources (e.g., dedicated code, STID, security parameters, etc.) to be allocated to the AMS are negotiated between the S-ABS and the T-ABS. The S-ABS may allocate a plurality of T-ABSs to the AMS according to conditions. If the AMS initiates HO, it requests HO through the AAI-HO-REQ message and receives the above-mentioned information from the ABS through an HO command (AAI_HO-CMD) message. In this case, the AAI_HO-CMD message may include an action time and a disconnect time. The action time indicates a time when the AMS performs network re-entry and the disconnect time indicates a time when the S-ABS releases downlink and uplink (DL/UL) resource allocation to the AMS.

In the HO execution procedure, the AMS performs a network re-entry procedure to the T-ABS at the time indicated by the action time. In this case, the AMS may perform the network re-entry procedure through a CDMA ranging message or a ranging request (AAI_RNG-REQ) message. In the case of EBB, the AMS continuously exchanges information with the S-ABS during a predetermined Available Interval (AI). Meanwhile, during an Un-Available Interval (UAI), the AMS performs network re-entry to the T-ABS. In the case of Break-Before-Entry (BBE) HO, the AI or UAI is not determined. Therefore, the AMS operates in the same manner as for hard HO in a general IEEE 802.16e network.

The above-mentioned HO procedure will hereinafter be described in detail with reference to FIG. 2.

Figure 2:
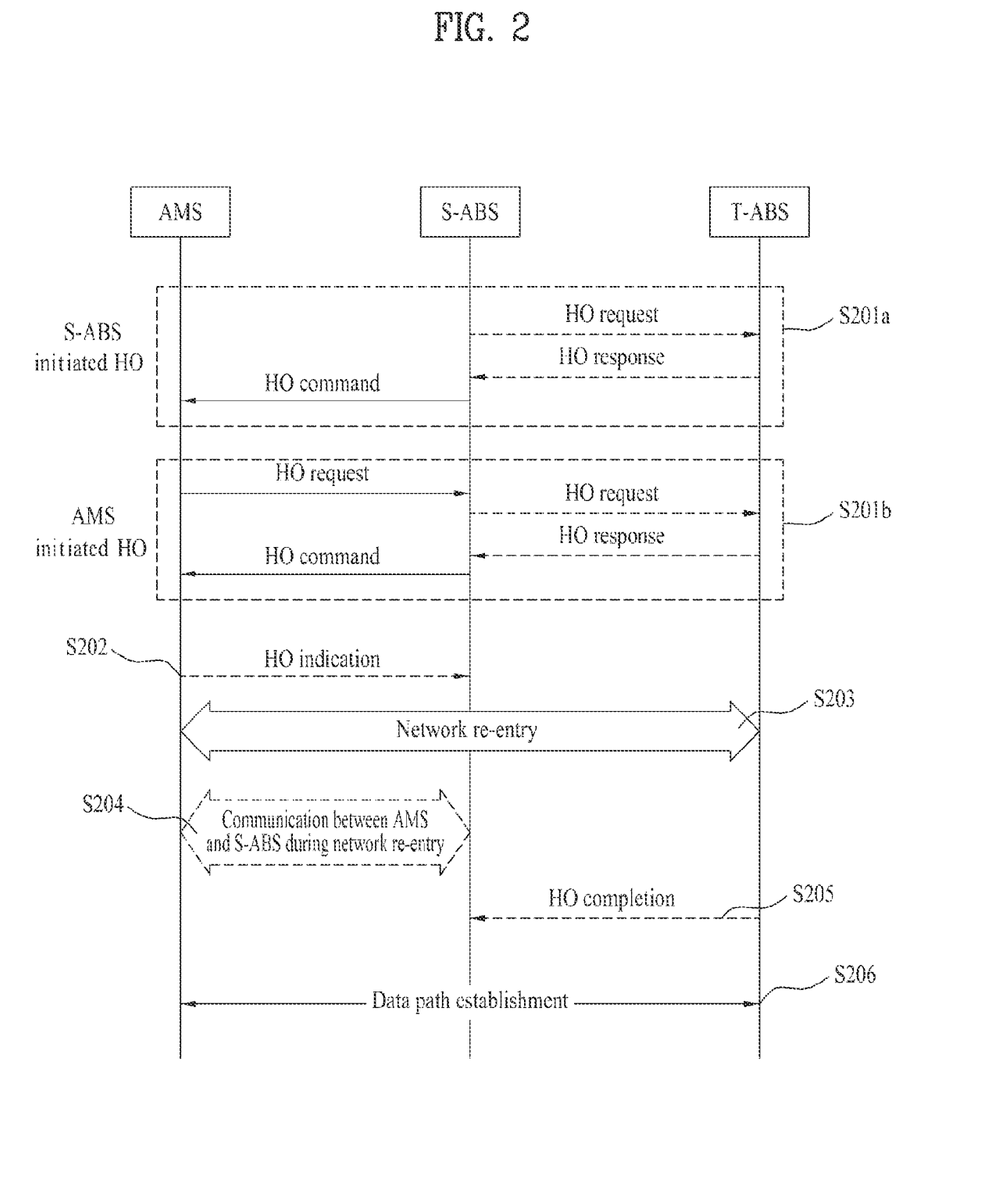
FIG. 2 illustrates an example of an HO procedure in a general IEEE 802.16m system.

FIG. 2 illustrates an example of an HO procedure in a general IEEE 802.16m system.

Referring to FIG. 2, the HO procedure may be initiated by an S-ABS at step S201a or may also be initiated by an AMS at step S201b. In the case where the AMS initiates the HO procedure, the AMS transmits an HO request (AAI_HO-REQ) message so as to request the SBS to perform HO, but the SBS can initiate the HO procedure without receiving a corresponding message from the AMS.

Upon receiving an HO command (AAI_H0-CMD) message from the S-ABS, the AMS may selectively transmit an HO indication (AAI_HO-IND) message to the S-ABS at step S202. Conditions under which the AMS transmits the AAI_HO-IND message to the S-ABS are as follows.

1) When the AMS desires to cancel HO on the basis of conditions decided by the S-ABS.

2) When the number of candidate T-ABSs present in the AAI_HO-CMD message is plural and the AMS selects any one of the candidate T-ABSs.

3) When it is impossible to access all candidate T-ABSs contained in the AAI_H0-CMD message.

4) When it is impossible to maintain connection to the S-ABS prior to the expiration of a disconnect time.

Thereafter, the AMS performs network re-entry to the T-ABS at step S203.

If EBB HO is carried out or if the S-ABS performs scheduling prior to expiration of a disconnect time, the AMS may exchange data with the S-ABS during the network re-entry procedure at step S204.

If network re-entry is completed, the T-ABS informs the S-ABS of HO completion at step S205. The AMS may normally exchange data with the target ABS at step S206.

In the above-mentioned HO procedure, the AMS may transmit an HO request (AAI_HO-REQ) message to the S-ABS so as to initiate the HO procedure. The S-ABS transmits an HO command (AAI_HO-CMD) message to the AMS, such that it commands the AMS to perform HO. In this case, if the AMS or S-ABS has not successfully transmitted or received an HO-related MAC management message, a problem may occur in the HO procedure.

For example, if the AMS initiates HO, HO is initiated through transmission of the AAI_HO-REQ message. If the AMS receives the AAI_HO-CMD message from the S-ABS, HO is carried out actually. In this case, if the AAI_HO-CMD message is lost such that the AMS does not receive the AAI_HO-CMD message, the S-ABS may retransmit the AAI_HO-CMD message or retransmit the AAI_HO-REQ message, such that stability of the HO procedure can be guaranteed so as to carry out normal HO.

Hereinafter, a delay time which may occur in the above-described HO procedure will be described with reference to FIG. 3.

Figure 3:
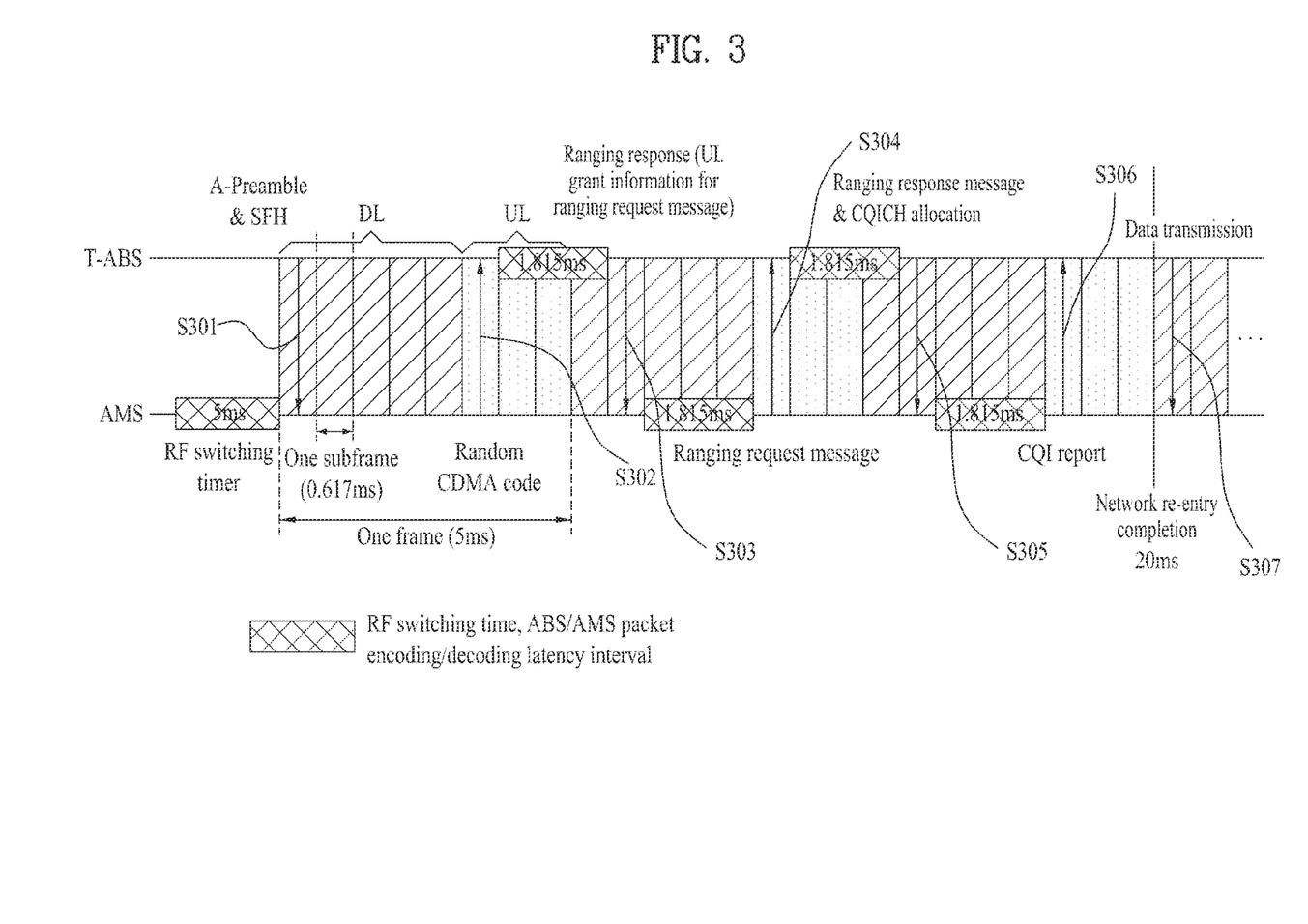
FIG. 3 illustrates a frame structure explaining a delay time which may occur in a general HO process.

FIG. 3 illustrates a frame structure explaining a delay time which may occur in a general HO process.

Referring to FIG. 3, an AMS performs Radio Frequency (RF) switching from a frequency of an S-ABS to a frequency of a T-ABS and receives an Advanced-preamble (A-preamble) and a Super Frame Header (SFH) in the first DL subframe of a corresponding superframe from the T-ABS, thereby performing synchronization and system information acquisition at step S301.

The AMS is able to be aware of a ranging region of the T-ABS in a UL subframe, based on the acquired system information and may transmit a CDMA ranging code which is randomly selected in the ranging region to the T-ABS at step S302.

Upon receiving the ranging code, the T-ABS may transmit a MAC message indicating whether ranging is successful or not, i.e. a ranging acknowledgement (AAI_RNG-ACK) message, to the AMS at step S303. In this case, if the ranging result is successful, the T-ABS may transmit, to the AMS, UL grant information indicating a UL resource allocated to transmit a ranging request (AAI_RNG-REQ) message.

Next, the AMS may transmit the ranging request message to the T-ABS through the allocated UL resource at step S304.

Upon receiving the ranging request message from the AMS, the T-ABS may transmit a ranging response (AAI_RNG-RSP) message to the AMS at step S305.

At this time, the T-ABS may allocate a Channel Quality Information Channel (CQICH) to the AMS for the purpose of channel measurement reporting.

The AMS may then transmit CQI to the T-ABS through the allocated channel at step S306, thereby completing an HO process and thereby normally exchanging data with the T-ABS at step S307.

In the above process described with reference to FIG. 3, an interruption time of a total of 20 ms during which the AMS does not exchange data with the ABS occurs. This interruption time corresponds to the case where ranging is successful on the first try and, if the ranging result is 'continue', additional interruption time may occur due to additional ranging.

Hereinafter, EBB HO will be described in detail with reference to FIG. 4.

Figure 4:
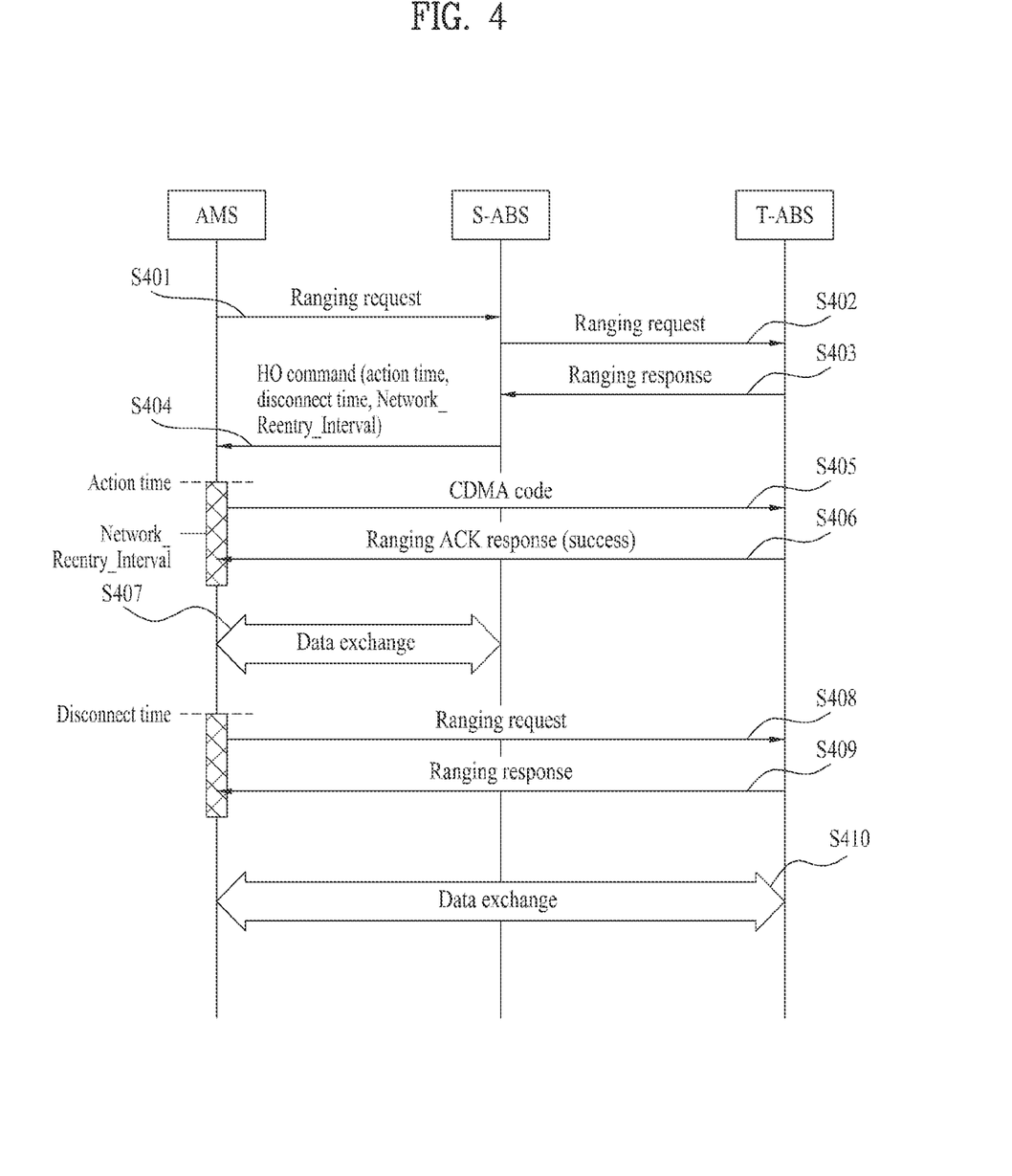
FIG. 4 illustrates an example of EBB HO performed in a general IEEE 802.16m system.

FIG. 4 illustrates an example of EBB HO performed in a general IEEE 802.16m system.

In FIG. 4, steps S401 to S403 are similar to the above-described step S201 b and therefore a repetitive description thereof will be omitted for clarity of specification. However, in an HO related information exchange/negotiation process of a T-ABS and an S-ABS through steps S402 and S403, negotiation of parameters for EBB HO may be additionally performed. Here, whether an AMS is capable of performing EBB HO can be determined by the S-ABS through an AMS basic capability (AAI_SBC-REQ/RSP) message which is exchanged when the AMS performs network entry to the S-ABS.

The S-ABS may transmit information demanded for EBB HO to the AMS through an HO command (AAI_HO-CMD) message at step S404.

Examples of the information transmitted to the AMS through the AAI_HO-CMD message include a network re-entry interval (Network_Reentry_Interval) indicating an interval during which scheduling for a corresponding AMS is not performed so that the AMS can exchange an HO related signal with the T-ABS, an action time indicating the start point of the Network_Reentry_Interval, and a disconnect time indicating the release time of connection with the S-ABS.

If an action time is reached, the AMS transmits a CDMA HO ranging code to the T-ABS during an interval (i.e. Network_Reentry_Interval) indicated by Network_Reentry_Interval information at step S405. Upon successful reception of the code, the T-ABS may transmit a ranging acknowledgement (AAI_RNG-ACK) message indicating success to the AMS at step S406.

If the Network_Reentry_Interval has ended, the AMS may again perform data exchange with the S-ABS at step S407. Consequently, if the Network_Reentry_Interval increases, an interruption time undergone by the AMS increases, and if the Network_Reentry_Interval decreases, the interruption time decreases.

If a disconnect time is reached, the AMS transmits a ranging request (AAI_RNG-REQ) message to the T-ABS at step S408 and the T-ABS may transmit a ranging response (AAI_RNG-RSP) message to the AMS at step S409.

Then an HO process is successfully completed and the AMS and the T-ABS normally exchange data at step S410.

As a method for reducing the interruption time by minimizing the Network_Reentry_Interval, a method for simplifying a network re-entry procedure or splitting the network re-entry procedure may be used. In the present invention, a method is disclosed in which the AMS splits the network re-entry procedure to perform HO to the T-ABS. Here, splitting the network re-entry procedure means that the AMS separately transmits and receives a signal transmitted to the T-ABS and a response thereto, for example, a CDMA ranging code and an AAI_RNG-ACK message for the ranging code, so as to perform UL synchronization.

To this end, in an exemplary embodiment of the present invention, an HO execution method in which an AMS receives information about a result of ranging execution through an S-ABS, for the purpose of more efficient EBB HO is proposed.

In more detail, similarly to general EBB HO, an S-ABS informs an AMS of EBB HO related information which is coordinated through negotiation with a T-ABS through an HO command message and the AMS performs HO based on the information. However, in the present embodiment, the AMS transmits only a CDMA HO ranging code to the T-ABS and receives a service again from the S-ABS. In this case, the T-ABS receiving the CDMA ranging code transmitted by the AMS reports the received result value, for example, a ranging status, physical offset values (physical offset, time offset, etc.) for the received code, and the like to the S-ABS of a corresponding AMS. The S-ABS receiving such report may transmit the reported information to the AMS. Accordingly, a ranging procedure for HO can be performed even in a Network_Reentry_Interval during which the AMS is able to transmit the CDMA code to the T-ABS. This is described with reference to FIG. 5.

Figure 5:
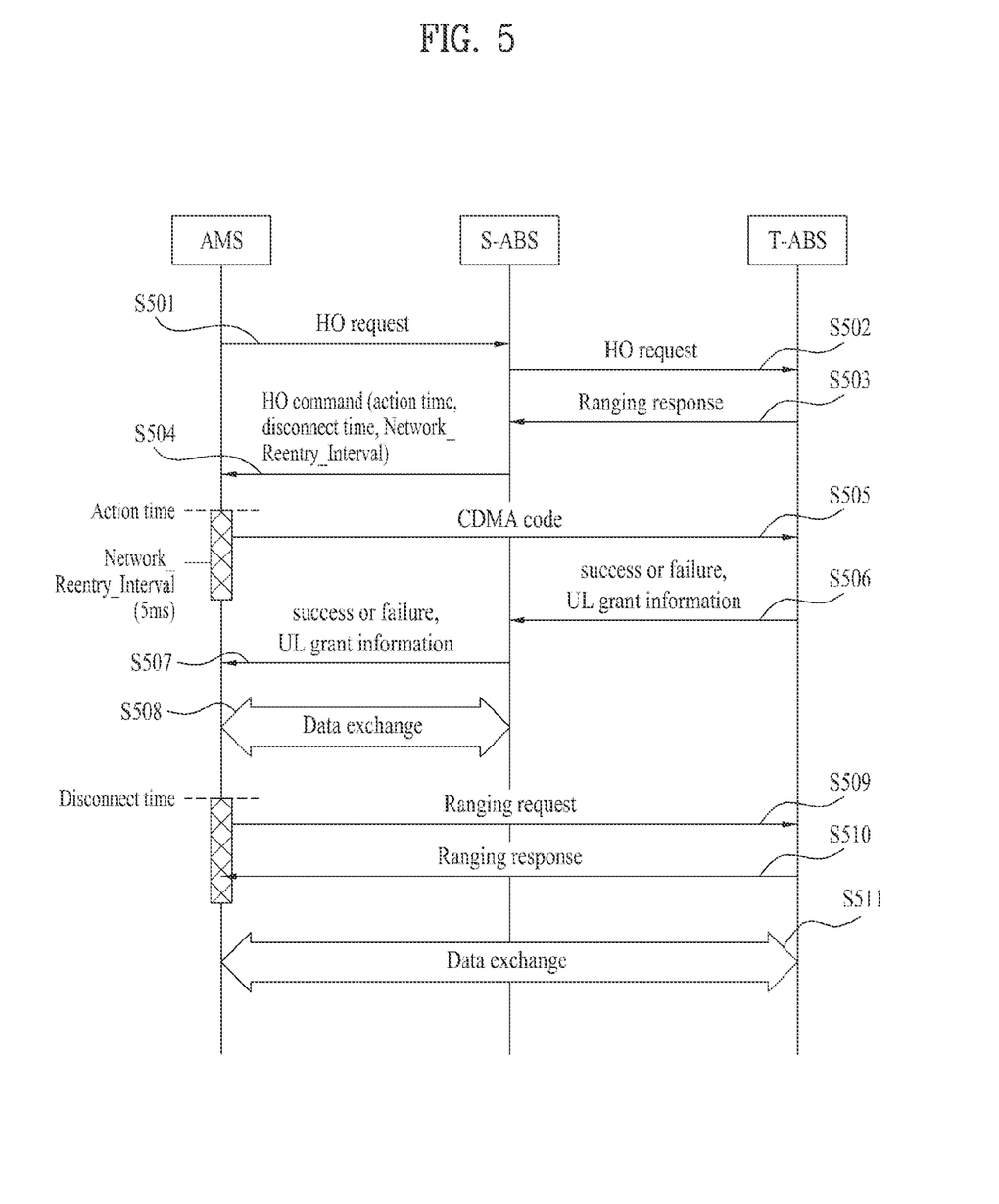
FIG. 5 illustrates an example of an EBB HO execution procedure according to an exemplary embodiment of the present invention.

FIG. 5 illustrates an example of an EBB HO execution procedure according to an exemplary embodiment of the present invention.

Referring to FIG. 5, an AMS may request an S-ABS to perform HO through an HO request (AAI_HO-REQ) message at step S501.

To coordinate HO of the AMS with T-ABS(s) (or candidate ABS(s)) preferred by the AMS or with T-ABS(s) recommended by the S-ABS, the S-ABS exchanges information through a backhaul with the T-ABS(s) at steps S502 and S503.

The S-ABS transmits information coordinated with the T-ABS(s) to the AMS through an HO command (AAI_HO-CMD) message at step S504.

The AAI_HO-CMD message may include the following parameters:
- a start time of Network_Reentry_Interval or an action time indicating time when code transmission to the T-ABS can be performed,
- A disconnect time indicating when scheduling is stopped from the S-ABS.
- a recommended T-ABS,
- a preamble index of a T-ABS,
- HO re-entry mode,
- optional EBB configuration,
- HO_Reentry_Interval,
- a resource retention time,
- a dedicated CDMA ranging flag (Dedicated_CDMA_RNG_FLAG), and
- a dedicated UL grant flag indicating assignment of unsolicited UL grant for AAI_RNG-REQ at a T-ABS.

The AMS may start a network re-entry procedure by transmitting a CDMA ranging code to the T-ABS after the action time included in the AAI_HO-CMD message at step S505.

In this case, it is preferable that the Network_Reentry_Interval be set to 5 ms. After transmitting the CDMA ranging code to the T-ABS, the AMS normally exchanges data again with the S-ABS at step S508.

Meanwhile, upon receiving the CDMA ranging code, the T-ABS transmits a ranging acknowledgement (AAI_RNG-ACK) message, or information included in the AAI_RNG-ACK message through another type of backhaul message, to the S-ABS of the AMS through a backhaul at step S506.

In this case, the information transmitted by the T-ABS to the S-ABS may be the same as information included in a general AAI_RNG-ACK message or some of the information may be added or omitted according to a backhaul message type. However, the corresponding backhaul message preferably includes a ranging status or a physical offset value. In FIG. 5, it is assumed that a ranging status is success.

If the S-ABS receives the AAI_RNG-ACK message or information corresponding thereto, which is to be transmitted to the AMS from the T-ABS, the S-ABS may transmit the AAI_RNG-ACK message or information to the AMS through the AAI_RNG-ACK message including the corresponding information, an AAI_RNG-RSP message, or other MAC messages at step S507.

In this case, if a result of code transmission is transmitted to the AMS through the AAI_RNG-RSP message, the AAI_RNG-RSP message will be of an unsolicited type and will include a parameter indicating that a corresponding message is a message transmitted from the T-ABS which has previously attempted ranging using a code. An example of such a parameter includes a BSID of the T-ABS, a message type field (AAI_RNG-RSP_type which is of an EBB association based AAI_RNG-RSP type), etc. The AAI_RNG-RSP message may also include UL allocation information for transmitting an AAI_RNG-REQ message by the AMS. The above-mentioned AAI_RNG-RSP message may be replaced with the AAI_RNG-ACK message or other MAC messages.

The AMS transmits a ranging request (AAI_RNG-REQ) message to the T-ABS through a UL resource indicated by the UL allocation information received from the S-ABS at step S509.

Upon receiving the AAI_RNG-REQ message, the T-ABS transmits a ranging response (AAI_RNG-RSP) message to the AMS at step S510 and the AMS performs remaining processes such as CQI report, thereby completing an HO procedure. Next, the AMS normally exchanges data with the T-ABS at step S511.

Although, in FIG. 5, only one Network_Reentry_Interval is considered, a plurality of Network_Reentry_Intervals may be configured when procedures other than HO CDMA ranging are necessary and the Network_Reentry_Interval may be reconfigured even when a result of ranging execution is not 'success'. This is described with reference to FIG. 6.

Figure 6:
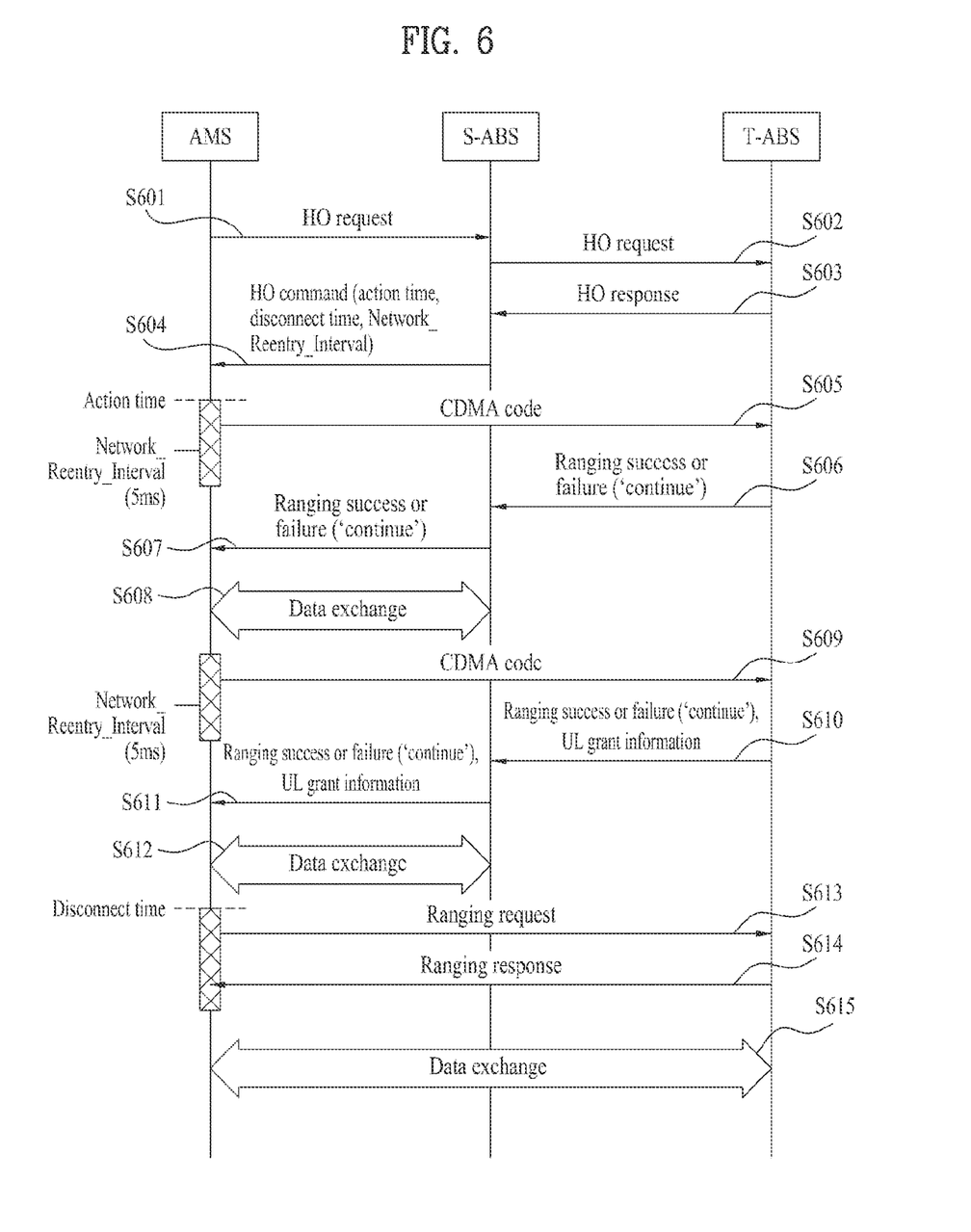
FIG. 6 illustrates an HO procedure when a ranging result through a code in an EBB HO execution method is 'continue' according to an exemplary embodiment of the present invention.

FIG. 6 illustrates an HO procedure when a ranging result through a code in an EBB HO execution method is 'continue' according to an exemplary embodiment of the present invention.

In FIG. 6, steps S601 to S605 are similar to steps S501 to S505 of FIG. 5 and therefore a repetitive description thereof is omitted for clarity of specification.

It has been assumed in FIG. 5 that a transmission result of a CDMA ranging code transmitted to the T-ABS within the Network_Reentry_Interval is 'success', whereas it is assumed in FIG. 6 that the result is 'continue'.

A T-ABS transmits a backhaul message including information indicating that a ranging status (i.e. whether ranging is successful or not) is 'continue' to an S-ABS at step S606.

The S-ABS receiving the information indicating a ranging status from the T-ABS transmits a MAC message including the corresponding information to an AMS at step S607.

Next, the AMS exchanges data with the S-ABS at step S608, receives the Network_Reentry_Interval, and transmits a CDMA code to the T-ABS during the corresponding interval at step S609.

If ranging through the CDMA code is successful, the next steps S610 to S615 are similar to the above-described steps S506 to S511 in FIG. 5. Therefore, a repetitive description is omitted.

Figure 7:
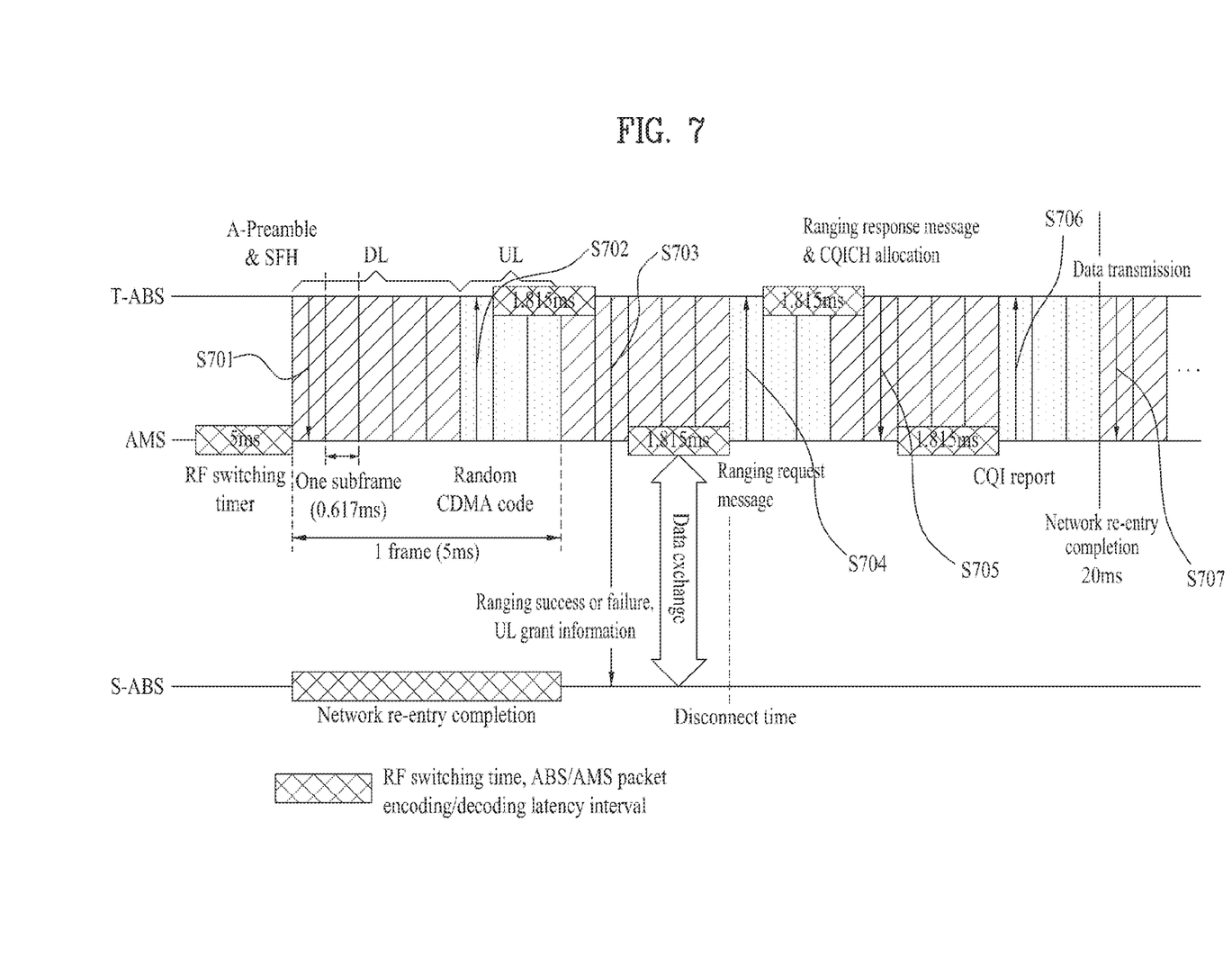
FIG. 7 illustrates a frame structure explaining a delay time which may occur in an EBB HO process according to an exemplary embodiment of the present invention.

Next, an interruption time when the above-described HO procedure is applied is described with respect to FIG. 7.

FIG. 7 illustrates a frame structure explaining a delay time which may occur in an EBB HO process according to an exemplary embodiment of the present invention.

Referring to FIG. 7, an AMS performs an RF switching from a frequency of an S-ABS to a frequency of a T-ABS during Network_Reentry_Interval and receives an A-preamble and an SFH in the first DL subframe of a corresponding superframe from the T-ABS, thereby performing synchronization and system information acquisition at step S701.

It is assumed that the allocated Network_Reentry_Interval is 5 ms.

The AMS is able to be aware of a ranging region of the T-ABS in a UL subframe, based on the acquired system information and may transmit a CDMA ranging code which is randomly selected tin the ranging region to the T-ABS at step S702.

Upon receiving the ranging code, the T-ABS may transmit a MAC message indicating whether ranging is successful or not, i.e. information included in a ranging acknowledgement (AAI_RNG-ACK) message, to an S-ABS through a backhaul message at S703.

In this case, if the ranging result is successful, the T-ABS may transmit, to the S-ABS, UL grant information indicating a UL resource allocated by the AMS to transmit a ranging request (AAI_RNG-REQ) message.

Meanwhile, if the Network_Reentry_Interval is completed, the AMS again receives scheduling from the S-ABS and may exchange data with the S-ABS. In this case, the S-ABS may transmit information (i.e. ranging success or failure, ranging status, and UL grant information) received from the T-ABS to the AMS.

Next, the AMS may transmit a ranging request message to the T-ABS through the allocated UL resource at step S704.

Upon receiving the ranging request message from the AMS, the T-ABS may transmit a ranging response (AAI_RNG-RSP) message to the AMS at step S705.

At this time, the T-ABS may allocate a CQICH to the AMS for the purpose of channel measurement report.

The AMS may then transmit CQI to the T-ABS through the allocated channel at step S706 and completes an HO process, thereby normally exchanging data with the T-ABS at step S707.

When comparing the above process with the case of FIG. 3, it can be appreciated that a total interruption time is reduced by 5 ms due to reduction of the Network_Reentry_Interval.

Structure of MS And BS

Hereinafter, a description will be given of an MS and a BS (femto BS (FBS) and macro BS (MBS)) for implementing the above-described exemplary embodiments of the present invention, according to another exemplary embodiment of the present invention.

The MS may operate as a transmitter in UL and as a receiver in DL, while the BS may operate as a receiver in UL and as a transmitter in DL. That is, each of the MS and the BS may include a transmitter and a receiver for transmission and reception of information or data.

The transmitter and the receiver may include processors, modules, parts, and/or means for implementing the exemplary embodiments of the present invention. Especially, the transmitter and the receiver may include modules (means) for encrypting messages, modules for interpreting encrypted messages, antennas for transmitting and receiving messages, etc. An example of the transmitter and the receiver will be described below with reference to FIG. 8.

Figure 8:
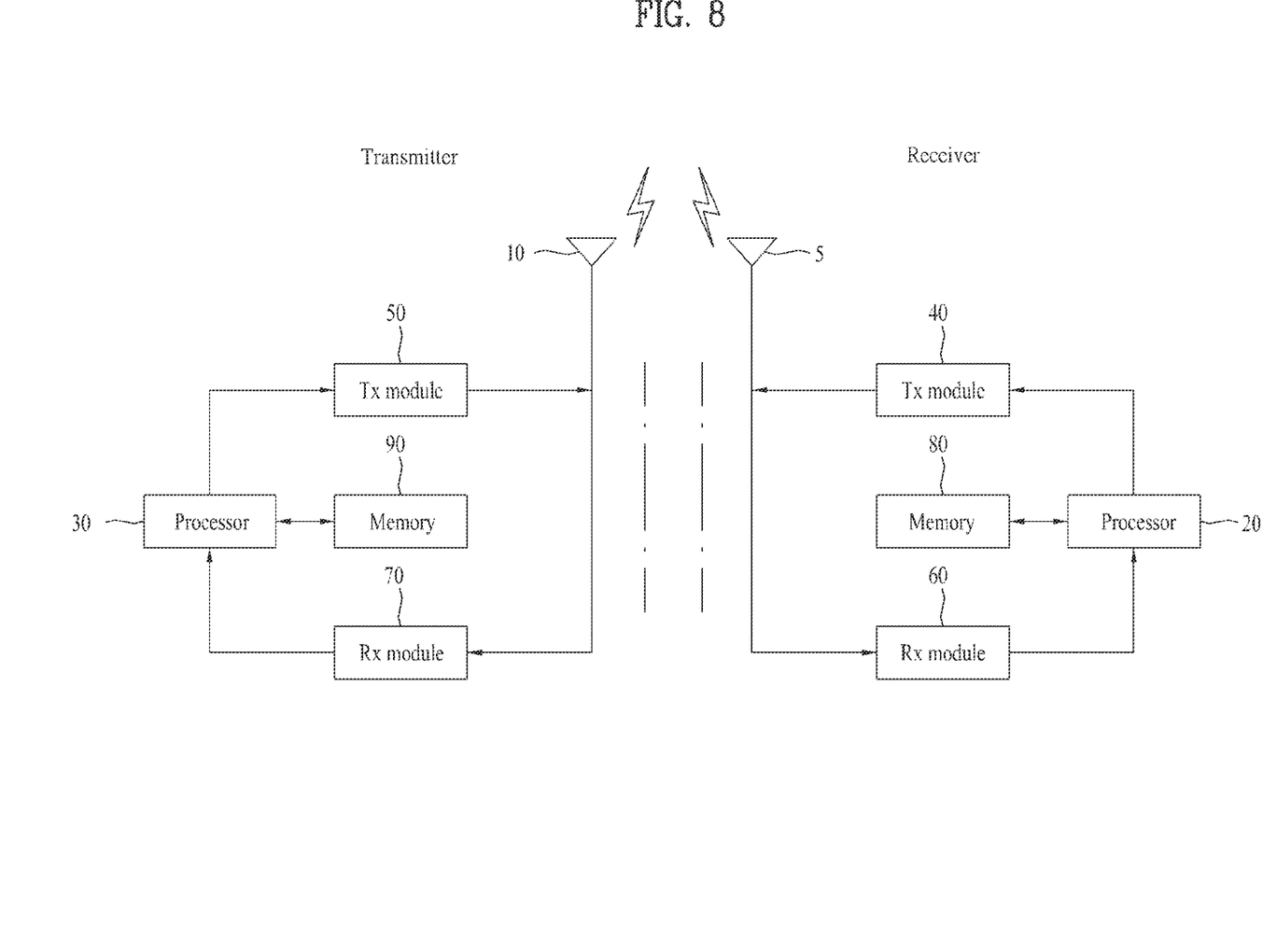
FIG. 8 illustrates structures of a transmitter and a receiver according to another exemplary embodiment of the present invention.

FIG. 8 is a block diagram illustrating the structures of a transmitter and a receiver according to another exemplary embodiment of the present invention.

Referring to FIG. 8, the left part illustrates the structure of the transmitter and the right part illustrates the structure of the receiver. Each of the transmitter and the receiver may include an antenna 5 or 10, a processor 20 or 30, a Transmission (Tx) module 40 or 50, a Reception (Rx) module 60 or 70, and a memory 80 or 90. The constituent elements of the transmitter may perform functions of the counter parts of the receiver. The constituent elements of the transmitter and the receiver will be described below in more detail.

The antennas 5 and 10 transmit signals generated from the Tx modules 40 and 50 to the exterior, or receive RF signals from the exterior and provide the received RF signals to the Rx modules 60 and 70. If a Multiple Input Multiple Output (MIMO) function is supported, two or more antennas may be provided.

The antenna, the Tx module, and the Rx module may constitute an RF module.

The processors 20 and 30 generally control overall operation of the MS. For example, the processors 20 and 30 may perform a control function for implementing the above-described exemplary embodiments of the present invention, a variable MAC frame control function based on service characteristics and propagation environment, an HO function, an authentication and encryption function, etc. In more detail, the processors 20 and 30 may provide overall control for performing the random access procedure.

Specifically, the processor of the AMS may perform a control function such that a CDMA ranging code can be transmitted to the T-ABS during the Network_Reentry_Interval using information (e.g. action time, Network_Reentry_Interval, etc.) included in the handover command message received from the S-ABS. Next, the processor of the AMS may perform the EBB HO procedure and receive information about a ranging status not from the T-ABS but from the S-ABS, thereby performing an HO procedure having a minimized interruption time.

Additionally, the processor of the AMS may provide overall control to the operation processes described in the above-mentioned embodiments.

The Tx modules 40 and 50 may encode and modulate transmission data scheduled by the processors 20 and 30 and provide the encoded and modulated data to the antenna 10.

The Rx modules 60 and 70 may restore original data by demodulating and decoding RF signals received through the antennas 5 and 10 from the exterior and provide the restored data to the processors 20 and 30.

The memories 80 and 90 may store programs for processing and controlling the processors 20 and 30 and temporarily store input/output data. Each of the memories 80 and 90 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

Meanwhile, the BS may perform a control function for implementing the above-described exemplary embodiments of the present invention, Orthogonal Frequency Division Multiple Access (OFDMA) packet scheduling, Time Division Duplex (TDD) packet scheduling and channel multiplexing functions, a variable MAC frame control function based on service characteristics and propagation environments, a real-time high-speed traffic control function, an HO function, an authentication and encryption function, a packet modulation/demodulation function for data transmission, a high-speed packet channel coding function, a real-time modem control function, etc., by at least one of the above-described modules, or the BS may further include an additional means, module, or part for performing these functions.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. Further, claims which are not explicitly dependent on each other can be combined to provide an embodiment or new claims can be added through amendment after this application is filed.

Industrial Applicability

Although the more efficient HO execution method in the broadband wireless access system and the MS structure therefor have described focusing on an IEEE 802.16m system, they are applicable to a variety of mobile communication systems other than IEEE 802.xx systems.

The invention claimed is:

1. A method for performing handover by a mobile station in a wireless access system, the method comprising:
   receiving a handover command message including information related to a specific time window, wherein no communications with a serving base station (SBS) are allowed during the specific time window;
   transmitting a ranging code to a target base station (TBS) during the specific time window; and
   receiving a message in response to the ranging code from the TBS or the SBS,
   wherein the message in response to the ranging code includes a parameter indicating that the message is transmitted from the TBS only if the message in response to the ranging code is received from the SBS.

2. The method of claim 1, wherein the message received from the SBS in response to the ranging code is transmitted by the TBS to the SBS through a backhaul.

3. The method of claim 1, wherein, if the message received in response to the ranging code indicates that the transmission of the ranging code is successful, further comprising:
   receiving uplink grant information from the SBS indicating an uplink resource for transmitting a ranging request message; and
   transmitting the ranging request message to the TBS through the uplink resource.

4. The method of claim 1, wherein:
   the handover is Entry-Before-Break (EBB) handover;
   the ranging code is a handover ranging preamble code; and
   the specific time window is a Network_Reentry_Interval.

5. A mobile station comprising:
   a Radio Frequency (RF) module configured to transmit and receive a radio signal; and
   a processor configured to:
   receive a handover command message including information related to a specific time window, wherein no communications with a serving base station (SBS) are allowed during the specific time window;
   transmit a ranging code to a target base station (TBS) during the specific time window; and
   receive a message in response to the ranging code from the TBS or the SBS,
   wherein the message in response to the ranging code includes a parameter indicating that the message is transmitted from the TBS only if the message in response to the ranging code is received from the SBS.

6. The mobile station of claim 5, wherein:
   the message received from the SBS in response to the ranging code is transmitted by the TBS to the SBS through a backhaul.

7. The mobile station of claim 5, wherein the processor is further configured to perform a control function to receive uplink grant information from the SBS indicating an uplink resource for transmitting a ranging request message if the message received in response to the ranging code indicates that the ranging code transmission is successful and to transmit the ranging request message to the TBS through the uplink resource.

8. The mobile station of claim 5, wherein:
   the handover is Entry-Before-Break (EBB) handover;
   the ranging code is a handover ranging preamble code; and
   the specific time window is a Network_Reentry_Interval.

* * * * *